Feb. 10, 1948. R. D. ROTH 2,435,754
ADJUSTABLE BRAKE BAND FOR SLUSHER HOISTS
Filed Dec. 26, 1944

INVENTOR.
ROBERT D. ROTH
BY
ATTORNEY

Patented Feb. 10, 1948

2,435,754

UNITED STATES PATENT OFFICE 2,435,754

ADJUSTABLE BRAKE BAND FOR SLUSHER HOISTS

Robert D. Roth, Cleveland, Ohio, assignor, by mesne assignments, to Le Roi Company, Milwaukee, Wis., a corporation of Wisconsin Application December 26, 1944, Serial No. 569,681

3 Claims. (Cl. 188—77)

1

The present invention relates broadly to slusher hoists, but more particularly to a brake band which as illustrated herein may be utilized as a clutch member for a slusher hoist.

The primary object of the invention is to provide means for adjusting a brake band of a slusher hoist without materially disturbing the assembly of parts.

Another object of the invention is to provide means for compensating for the wear of a brake band for a clutch which can be accomplished without tearing down the clutch assembly or altering the normal clutch connections.

A further object of the invention is to provide a brake adjusting means which is simple in construction, effective in operation and relatively inexpensive to manufacture.

Other objects and advantages more or less ancillary to the foregoing reside in the specific construction and aggroupment of the elements peculiar to this structure, as will become apparent from a more complete examination of the specification.

In the drawings—

Figure 1:
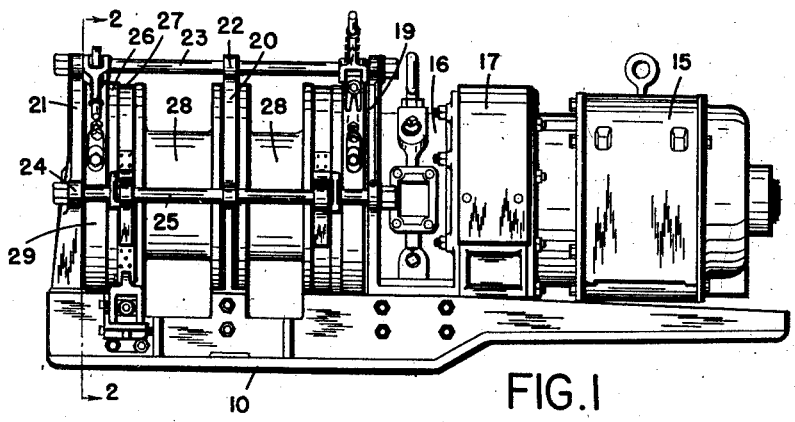
Figure 1 is a side longitudinal view of a hoist embodying the invention.
Figure 3:
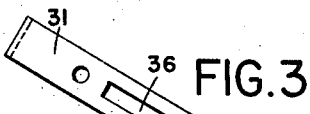
Figure 3 is a detail plan view of one of the elements of the clutch assembly.

Slusher hoists as presently constructed comprise a motor, a gear reduction coupled to the motor, the gears driving a pair of rope receiving drums through a pair of drums mounted adjacent thereto. In operation brake bands are employed for holding one of the drums against rotation and allowing the other drum to either remain stationary or rotate freely. The brake bands are mounted on the periphery of one of the driving drums and are operated by means of a handle. Such a band is illustrated in the present drawings and the invention is concerned with effecting a novel means of adjustment thereof.

Referring to the drawings for a more detailed description thereof, the reference numeral 10 represents a base frame including a pair of parallel side members 11 and 12 preferably made of L-shaped angle iron and secured together by any suitable means such as the cross members 13 and bolts 14. Longitudinally mounted on the frame

2

10 there is a hoist assembly shown to include a motor 15 and a gear reduction casing 16 united with the motor 15 through a suitable coupling 17. Projecting longitudinally away from the casing 16 there is a shaft 18 adequately journalled within longitudinally spaced bearing supports 19, 20 and 21. Each of these supports is rigidly secured to the base frame 10 while the upper end of each support is provided with a lug 22 through which extends a tie rod 23. The side portion of each support is provided with a similar lug 24 through which extends a tie rod 25.

Rotatably mounted on the shaft 18 adjacent each bearing support 19 and 21 there is a relatively narrow drum 26 operatively associated with a similar drum 27 which in turn is interconnected with the shaft 18 by any suitable gearing in a manner to drivingly rotate the drum 27 when the drum 26 is held against rotation, and allowing the drum 27 to either remain stationary or rotate freely when the drum 26 is free to rotate. Since the interconnecting mechanisms between the several shafts and drums above referred to form no part of this invention, no further explanation is thought necessary other than pointing out that each drum 27 is drivingly connected with a rope-winding drum 28 by any suitable means, the drum 28 being rotatably mounted on the shaft 18. It will now be understood that when the drum 26 is held against rotation both drums 27 and 28 are drivingly rotated in one or the other direction and that when the drum 26 is allowed to rotate, the drums 27 and 28 either remain stationary or are free to rotate when, for instance, subjected to the pull of the rope wound around each drum.

Figures 2, 4:
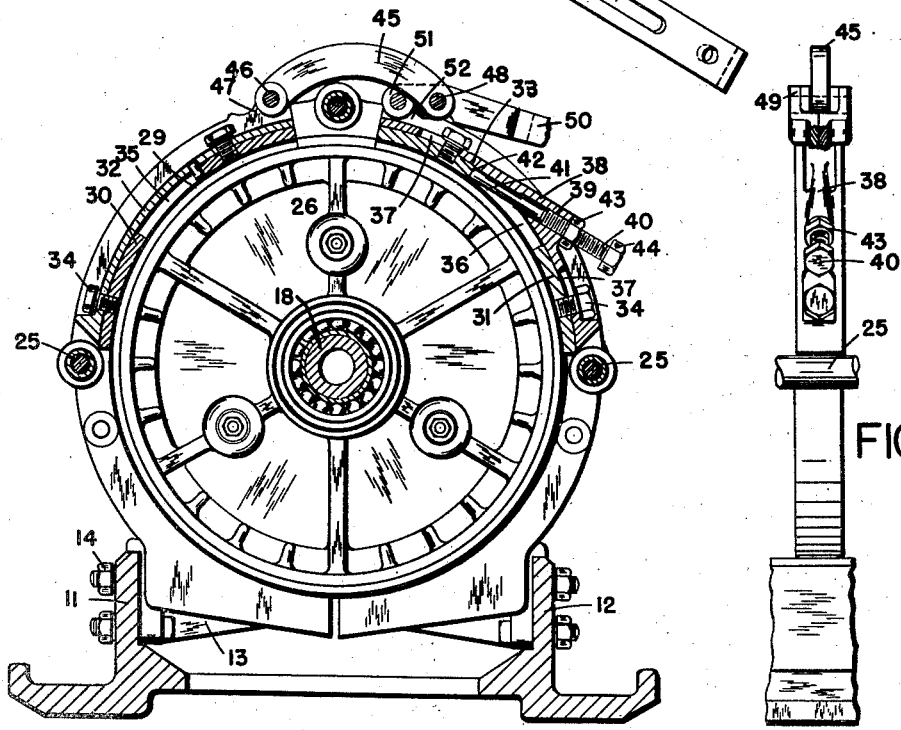
Figure 2 is a transverse sectional view thereof taken substantially on line 2—2 of Figure 1.
Figure 4 is a partial side elevational view with parts in section to illustrate the position of the brake adjusting means relative to the clutch assembly.

In order to control the rotation of each drum 26 there is provided a brake band 29 surrounding the periphery of the drum, the ends of the band being spaced one from the other at the top of the drum as clearly shown in Fig. 2. On opposite sides of the band 29 there is riveted or otherwise secured thereto the plates 30 and 31 which plates follow the contour of the band and extend from a point substantially in line with the tie rods 25 to the ends of the band, as more particularly shown in Figure 2 of the drawing. The plates 30 and 31 are formed of metal or similar material and mounted in superposed relation thereon is a second pair of plates 32 and 33, said last-mentioned plates being secured by means of cap screws or the like 34. The plates 30 and 31 are formed with elongated slots 35 and 36 respectively, while the plate 33 is formed with slots 37 through which the cap screws 34 are free to move, as will be hereinafter explained.

One or both of the plates 32 and 33 may be provided with means for adjusting the brake band 29 to compensate for wear thereof. It is only deemed necessary, however, to adapt this adjusting mechanism to a single plate as illustrated in Figure 2, and it will be noted that said plate is constructed with a portion 38 extending tangentially of the drum 26 and said portion is formed with a threaded bore 39 which carries an adjusting bolt 40. The inner end 41 of the bolt 40 moves within the elongated slot 36 and is held in abutting relation with the shoulder 42 of said plate. The outer end of the bolt carries a lock nut 43 and head 44 normally spaced one from the other in the manner shown.

When desiring to adjust the brake band 29 to compensate for wear, the cap screws 34 which clamp the plate 33 to the plate 31 are first loosened and then the lock nut 43 is also loosened, after which a suitable tool is applied to the head 44 and the bolt 40 advanced inwardly to elevate the brake band into closer engagement with the drum 26. As the bolt is advanced, it carries with it the plate 31, the plate 33 being held stationary due to its connection with the brake band and clutch actuating mechanism to be hereinafter more fully described. Movement of the plate 31 relative to the plate 33 is accomplished by reason of the slots 37. After the adjustment has been effected, the cap screws 34 are tightened so as to clamp the plate 33 on the plate 31 and the lock nut is tightened against the plate 31, thereby retaining the several parts in their adjusted position.

The means for actuating the brake band comprises a link 45 pivoted at one end 46 to an ear 47 extending from the plate 32, while the opposite end of said link is pivotally connected as indicated at 48 between the bifurcated ends 49 of the lever 50. The bifurcated end of the lever 50 is pivotally connected as indicated at 51 to the ear 52 extending upwardly from and forming a part of the plate 33. Downward pressure on the lever 50 brings the ends of the brake band together about the periphery of the drum 26 while upward pressure thereon separates the ends in a manner well known in this art.

From the above description when taken in connection with the accompanying drawing, it will be readily apparent that there has been provided a means for compensating the wear of a brake band without tearing down the clutch assembly or materially altering the normal clutch connections. The adjustment can be effected in a minimum amount of time by an adjustment that is simple in construction and relatively inexpensive to manufacture.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In mechanism of the character described, a drum, a brake band positioned around the drum, segmental plates upon which said band is mounted, means attached to said plates for actuating said band, an intermediate plate rigid with said band interposed between the band and one of said segmental plates, said intermediate plate having a longitudinal slot formed therein, and means carried by said last named segmental plate disposed in said slot and engaging said intermediate plate for adjusting said band with respect to said last named segmental plate.

2. In mechanism of the character described, a drum, a brake band positioned around said drum, segmental plates upon which said band is mounted, means attached to said plates for actuating said band, an intermediate plate rigid with said band interposed between the band and one of said segmental plates, said intermediate plate having a longitudinal slot formed therein, said last named segmental plate having a portion extending tangentially of the band, and means within said extending portion guided in said slot and engaging said intermediate plate for adjusting said band with respect to said last named segmental plate.

3. In mechanism of the character described, a drum, a brake band positioned around said drum, segmental plates upon which said band is mounted, means attached to said plates for actuating said band, an intermediate plate rigid with said band interposed between said band and one of said segmental plates, said intermediate plate having a longitudinal slot formed therein, said last named segmental plate having a portion extending tangentially of said band, and an adjusting screw in said extending portion guided in said slot and engaging said intermediate plate for adjusting said band with respect to said last named segmental plate.

ROBERT D. ROTH.

REFERENCES CITED

The following references are of record in the file of this patent:

UNITED STATES PATENTS

| Number | Name | Date |
|---|---|---|
| 1,523,712 | Proben | Jan. 20, 1925 |
| 1,945,166 | Sneed | Jan. 30, 1934 |
| 669,962 | Letts | May 13, 1902 |
| 2,055,330 | Bold | Sept. 22, 1936 |